Aug. 12, 1924. Re. 15,891

G. C. THOMAS, JR

ELECTRICAL CONNECTING DEVICE

Original Filed Nov. 21, 1919

INVENTOR

George C. Thomas Jr.

BY

Bakken & Pettis

ATTORNEYS

Reissued Aug. 12, 1924. Re. 15,891

UNITED STATES PATENT OFFICE.

GEORGE C. THOMAS, JR., OF NEW YORK, N. Y., ASSIGNOR TO THE THOMAS & BETTS CO., OF ELIZABETH, NEW JERSEY, A CORPORATION OF NEW JERSEY.

ELECTRICAL CONNECTING DEVICE.

Original No. 1,418,989, dated June 6, 1922, Serial No. 339,575, filed November 21, 1919. Application for reissue filed May 23, 1924. Serial No. 715,493.

*To all whom it may concern:*

Be it known that I, GEORGE C. THOMAS, Jr., of New York, N. Y., have invented certain new and useful Improvements in Electrical Connecting Devices; and I hereby declare that the following is a full, clear, and exact description thereof, which will enable others skilled in the art to which it appertains to make and use the same, reference being had to the accompanying drawings, and to the characters of reference marked thereon, which form a part of this specification.

My invention relates to devices for connecting metallic conduits and the like to electric outlet boxes and the like, and which is known as a cable connector.

Connectors have heretofore been proposed wherein connection between an electrical conduit and an outlet box was made by means of a sleeve formed in two parts, these parts being movably secured together at one end thereof in such manner that the opposite ends of the parts were free to move through a limited space toward and away from each other. The parts were provided at the free ends with a grooved seat. This seat portion was inserted within an opening in the wall of an outlet box and the parts of the sleeve forced apart into binding engagement with the periphery of the opening in the outlet box wall; and a clamping means was employed for simultaneously expanding the grooved seat into anchorage with the box knock out hole for fixing the cable securely to the connector.

Now my present invention comprises improvements over connectors of the character above referred to in that I provide an improved ring cable stop and bushing with a connector sleeve to act as a stop for the cable end and protect the cable wire insulation as the wire is worked through the connector; and I also provide improved joining means by which the rear or outside connector ends or edges are joined together in making a sleeve from one stamping or two stampings; and I also provide improvements enabling the manufacturer to produce a connector from two separate stampings or a one piece stamping.

In using two stampings, the parts are formed into half-round or semi-cylindrical shell parts and held together at one end by my improved joining or retaining means and left movably free at the other end for the purpose of expanding the connector into locked position in the cable box opening. On the other hand, a connector is formed from a single piece stamping by slitting, if desired, the sheet metal blank at one end through its grooved seat, and the blank is then curled or pressed into cylindrical form leaving the other end free to permit relative expansion and contraction.

It is fitting therefore that the purpose of my invention is to improve connectors to the point where they may be made from one or two stamped pieces and to thus produce an inexpensive connector.

In order that my invention be more clearly understood attention is hereby directed to the accompanying drawing forming part of this disclosure and illustrating embodiments of the said single part stamping and two part stamping; and it is understood how certain changes may be made without departing from the scope of the invention.

In the drawings Figures 1 to 6 inclusive illustrate the first form of the invention wherein two separate stampings are employed. Figures 7 to 9 inclusive illustrate the second form of the invention whereby a cable connector is constructed from a single metal stamping. The principle of the invention is the same in both forms, but there exists a slight difference in construction; and the improved ring stop bushing may or may not be employed in one or the other form depending on the wishes of the user.

Figure 7:
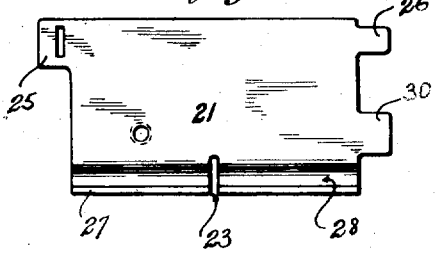

Coming now to a consideration of the modified form of the invention, Figure 7 illustrates a single piece stamping from which the connector, illustrated in the next two figures, is fashioned.

Figure 8:
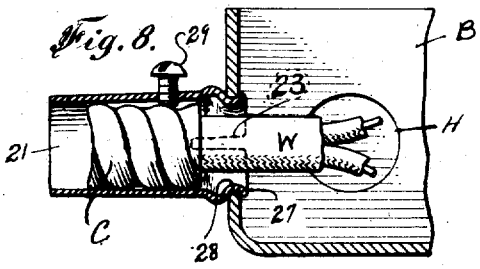

Figure 8 shows the single piece connector as curled and formed from the one piece stamping and locked to a box with a cable anchored in final position.

Figure 9:
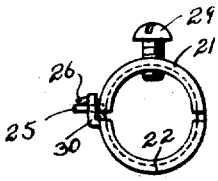

Figure 9 shows the improved one-piece connector in end elevation as detached from all other parts, and is the connector as formed from the stamping in Figure 7.

It is understood how most electrical fixture boxes B are provided with cable receiving openings or holes H usually in the form of knock-out plugs. A cable C must necessarily be inserted in the box for the purpose of exposing the wires W on the inner side thereof for making electrical connections with outlet wires, and my improved connectors afford means for suitably joining the cable C to the box B.

Describing first the two-part connector, there is shown an upper shell 4 and lower shell part 5 of complementary design and shape whereby the edges contact and fit together to complete a full cylindrical sleeve 4—5, and one end of the sleeve is made with an unrestricted opening for the reception of the cable while the forward end thereof is made with a large corrugation 6 forming an inner groove seat for a stop bushing 8, while a small reduced curl or corrugation 7 forms a groove seat on the exterior and end of the sleeve which fits in the box hole H and establishes anchorage therewith. The ring 8 forms a stop against which the cable end abuts while the rounded interior perforation of the ring provides a guide thru which the wires W are passed and drawn without damaging the insulation thereon.

The lower shell section 5 is provided on the rear end thereof with a pair of ears 12 diametrically opposite to each other, and the ears are perforated forming holes 13 in each ear. The upper connector section 4 is made with lips 14 which project thru the perforations 13 and are then bent or curled outwardly to form an interlock with the ears 12 whereby the two half-sections 4 and 5 are positively held together. While the inter-lock connection established between the lip 14 and ear 12 is substantially rigid, yet the lip 14 is not necessarily pinched and clamped down so firmly as to prevent relative motion between the two parts, for it is appreciated that one of the features of the invention rests in the capacity of the forward free ends of the connector to be slightly expanded which is to say that the seat formed by the small ring corrugation 7 is spread in the box hole H; and while it is intended that the rear ends of the two shell parts 4 and 5 remain joined together, the said lip and ear joint 12—14 is expected to afford sufficient lost motion as will permit relative motion to take place at the front end of the connector. In fact the connector when assembled may have its lip and ear joint 12—14 firmly pinched together, but inasmuch as the metal employed to make the connector is of suitable lightweight gauge, the electrician on the job may easily spread the front end of the connector to permit it to function properly under the influence of the cable clamp screw as will be described.

A pair of guide lugs or ears 16 are stamped integrally on one section, in this instance they are shown on the section 4, and are intended to overlap and break across the abutting edge seams of the assembled sections 4 and 5 for the purpose of holding the parts in alignment. While the lugs are not essential in all respects they are nevertheless employed in some forms of the connector to hold the parts in alignment.

A cable clamp screw 18 is carried in one of the sections and simultaneously applies pressure on the cable therein and expands the two connector sections by spreading them apart to establish rigid anchorage with the box hole H. This screw may if desired be mounted in an offset boss 19 formed in the wall of the shell 4 for the purpose of partly disposing the screw tangentially against the cable C. By decentering the screw in respect to the axis of the cable C and sleeve 4—5, the pressure imposed by the screw does not crush or injure the cable. Furthermore the offset or tangent screw affords a larger biting or gripping surface contact as between the cable wall and screw threads for increasing the capacity of anchorage. It is to be appreciated that the offset tangent cable clamp screw may be employed in either form of the invention or an ordinary center pointing screw, as shown in Figure 8, may be employed in either form of the invention depending somewhat upon the particular requirements of the user.

Figure 2:
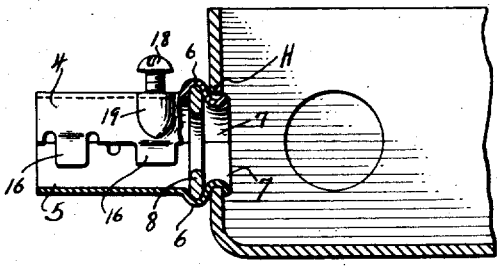
Figure 2 shows a sectional view through the electrical fixture box with the connector loosely placed therein prior to being expanded into anchoring position with the box. In this view, the upper shell of the connector is shown in elevation and section, while the lower shell part is shown in complete section.
Figure 3:
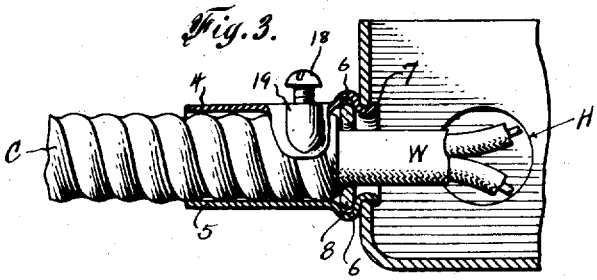
Figure 3 shows a sectional view through the connector inserted in a box with a cable in anchored position.
Figure 4:
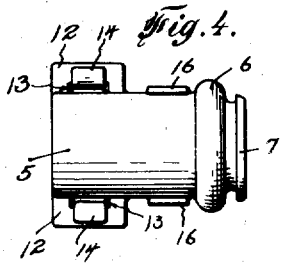
Figure 4 illustrates an underneath lengthwise elevation of the connector detached from all other parts.
Figure 5:
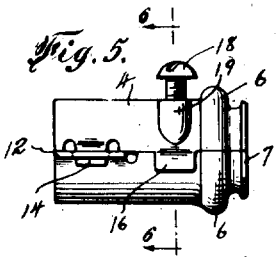
Figure 5 shows a side elevation of Figure 4.
Figure 6:
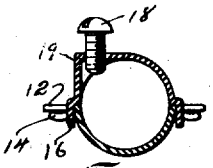
Figure 6 shows a sectional view developed along the line 6—6 of Figure 5.

In assembling a cable, a connector, and a box, the electrician presses the connector free ends together until they slip into position as shown in Figure 2 whereupon the cable C is inserted and the screw 18 driven down against the cable which expands the free ends of the sections 4 and 5 until the seat 7 is established in complete peripheral anchorage with the arcuate edge of the hole H in the box; and as the screw 18 goes down against the cable, there results a simultaneous pressing of the cable against the lower shell 5 together with an expansion of the free ends of both sections to establish anchorage with the box.

Figure 1:
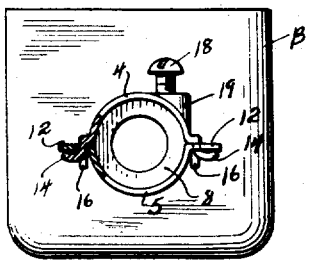
Figure 1 shows the connector inserted in a box without a cable, the said view being an outside end elevation.

In describing the second form of the invention reference is made to Figures 7, 8 and 9 wherein I have shown a blank 21 of thin sheet metal from which the device may be formed in place of the two sleeve members 4 and 5. One side of the stamping 21 is made with a perforated ear 25 while the other side is made with a connecting lip 26 which passes through the hole in the ear 25, as shown in Figure 9; and thereafter the registering lip may be curled or bent over similarly as described for the first form of the invention, and as shown for example in Figure 1, particularly the sectional portion thereof, but play is left in the lip and ear joint so as to permit the sleeve to expand or distort particularly at the box joining end.

The front end of the stamping 21 is pressed or stamped with a peripheral rib 27 which defines a curl or corrugation 28 formed adjacent thereto, one or more being made as desired; and a cut 23 is made through the front edge of the sleeve to render the grooved end somewhat flexible. This construction provides an anchorage seat for joinder with the box hole H as shown in Figure 8. A cable clamp screw 29 is carried by one of the parts and imposes pressure on the cable C for simultaneously expanding the free ends of the connector sections as well as jamming the cable against the opposite sleeve part. The stamping is curled into cylindrical form as shown in Figures 8 and 9 and loosely held together at the rear end by the lip and ear connection which possesses a certain amount of lost motion thereby permitting expansion, distortion or separation of the front ends of the connector, and the aforesaid split 23 cuts through the grooved end to relieve the rigidity thereof to permit the connector sleeve to expand causing the groove 28 and rib 27 to firmly engage the box knock out hole H.

A guide lug 30 may be stamped integrally with one of the parts and laps over and across the abutting edge of the other part to break the seam of the meeting edges when the connector is curled to produce a cylindrical sleeve. This projecting lug 30, while not essential, may be used to facilitate the alignment of parts when the stamping is curled or pressed to make the sleeve and thus constrain the two meeting edges to straight guided movement in contracting and expanding them in a cable box opening.

An important feature of my invention is that it provides a cable connector of the two-part type which is assembled without screws to hold the two sections together, the lip and ear joint taking the place of screws or other fastening means. Also my invention of the one piece type connector eliminates the use of both screws and lip and ear joints, and the one piece circular sleeve connector expands by increasing its diameter along the axis of the sleeve to enlarge the diameter of the groove 28 until it firmly seats itself in the box opening.

What I claim is:

1. In connecting devices, the combination of an outlet box having a wall with an opening therethrough, a sleeve device having a threaded aperture and adapted to receive an electric conduit, said device having a seat portion adapted to bind within said opening and comprising a plurality of parts movable to cause enlargement or restriction of said seat portion, a screw mounted in the threaded aperture of one of the parts and arranged to bear upon a conduit within said device to anchor the conduit in position and simultaneously force the parts of said portion outwardly into firm engagement with the periphery of said wall opening, and a ring bushing retained within a groove made adjacent the seat to form a stop for the end of the conduit and a guide for the cable wires.

2. In connecting devices, the combination of an outlet box having a cable opening, a split sleeve adapted to receive the cable, said sleeve provided with a seat formed of parts adapted to move inwardly or outwardly and said seat adapted to be inserted within said cable box opening when in their inward position, a clamping means carried by said sleeve so as to bind the conduit in position and simultaneously force the parts of said seat portion outwardly into firm engagement with the periphery of said wall opening, and a ring bushing retained within a groove made adjacent the seat.

3. In connecting devices, the combination of a box having a cable opening therethrough, a two-part sleeve adapted to receive the cable, the parts of the sleeve being so secured together at one end as to permit movement of the parts at the other end toward and away from each other, said last named end of said parts being provided with a groove seat adapted to bindingly engage within said opening, said sleeve parts jointly having a peripheral rib forming a groove within the same adjacent said seat, one of said parts having a threaded opening therein, a screw mounted in said threaded opening and arranged to bear upon the cable to anchor the cable in the sleeve and simultaneously force the parts of said seat portion away from each other into firm engagement with the periphery of said wall opening, and a ring retained within said groove to form a stop for the forward end of the outer armor of the conduit.

4. A cable connector comprising a pair of sheet metal stampings fashioned into semi-cylindrical shells, means joining the shells together at one end to make a tubular sleeve open at one end to receive a cable end, a circular corrugation formed at the other end of the sheet metal tubular connector, stop means held by the corrugation against which the said cable rests and the wires thereof pass through, a seating groove made in the end of the connector adjacent the stop means by which the connector is anchored in a box opening, and a clamping screw carried by the stamping adapted to simultaneously expand the seating groove and anchor a cable in the sleeve.

5. A cable connector comprising a pair of complementary half shell sections adapted to be fitted together in aligned relation edge to edge to produce a sleeve, a pair of perforated ears made on one section at the end thereof and turned outwardly, a pair of smaller ears made on the other section and projecting through the aforesaid perforated ears to connect the sections together at one end and hold them against spreading action at said connected end while the other end is left free to expand, a pair of overlapping guide lugs made on one section extending across the meeting edges of the other section to maintain said sections in movable alignment, means at one end by which the connector is anchored to a box by spreading the free end thereof, and a single means for executing said spreading action and for anchoring a cable inside the connector.

6. A cable connector comprising a pair of stampings forming complementary half shell sections fitted together forming a sleeve, freely movable retaining means on one end of the complementary sections fixing the parts together against separating movement at one end but permitting expansion of the sleeve at the other end, guide lugs formed on the other end of the sleeve and extending across the meeting shell edges to retain the sections in alignment during expansion, a seating groove corrugation pressed into the expansible sleeve end by which the connector is anchored to a box, said sleeve provided with a threaded aperture, and a clamp screw disposed in the aperture to clamp a cable in the sleeve and expand the connector at the corrugated end.

In testimony whereof I have signed this specification.

GEORGE C. THOMAS, Jr.